(12) United States Patent
Matzen

(10) Patent No.: US 9,909,944 B2
(45) Date of Patent: Mar. 6, 2018

(54) THIN FILM SENSOR

(71) Applicant: DANFOSS A/S, Nordborg (DK)

(72) Inventor: Steen Moellebjerg Matzen, Sydals (DK)

(73) Assignee: Danfoss A/S, Nordborg (DK)

( * ) Notice: Subject to any disclaimer, the term of this patent is extended or adjusted under 35 U.S.C. 154(b) by 47 days.

(21) Appl. No.: 14/895,228

(22) PCT Filed: May 8, 2014

(86) PCT No.: PCT/IB2014/061281
§ 371 (c)(1),
(2) Date: Dec. 2, 2015

(87) PCT Pub. No.: WO2014/199247
PCT Pub. Date: Dec. 18, 2014

(65) Prior Publication Data
US 2016/0123828 A1 May 5, 2016

(30) Foreign Application Priority Data

Jun. 11, 2013 (DK) .................................. 2013 00354

(51) Int. Cl.
G01L 9/00 (2006.01)
G01L 9/04 (2006.01)

(52) U.S. Cl.
CPC .............. *G01L 9/0055* (2013.01); *G01L 9/04* (2013.01)

(58) Field of Classification Search
CPC .................................................... G01L 9/0055
See application file for complete search history.

(56) References Cited

U.S. PATENT DOCUMENTS

| 4,058,254 A | 11/1977 | Hallgreen |
| 4,777,826 A * | 10/1988 | Rud, Jr. ................ G01L 1/2281 338/195 |
| 4,862,382 A | 8/1989 | Schneider et al. |
| 4,903,000 A | 2/1990 | Yajima et al. |
| 5,681,997 A | 10/1997 | McHale et al. |
| 6,134,971 A | 10/2000 | Misra et al. |
| 6,644,127 B1 | 11/2003 | Matzen |

(Continued)

FOREIGN PATENT DOCUMENTS

| CN | 101566514 A | 10/2009 |
| CN | 101639391 A | 2/2010 |

(Continued)

OTHER PUBLICATIONS

International Search Report for PCT Serial No. PCT/IB2014/061281 dated Aug. 19, 2014.

(Continued)

*Primary Examiner* — Clayton E Laballe
*Assistant Examiner* — Dennis Hancock
(74) *Attorney, Agent, or Firm* — McCormick, Paulding & Huber LLP

(57) ABSTRACT

A sensor (1) comprising a membrane, an isolation layer (3) arranged on the membrane, measuring electronics comprising a thin film circuit (4), e.g. in the form of a Wheatstone bridge, deposited on the isolation layer (3), and a power supply (14) arranged to supply a quasi-DC voltage to the thin film circuit (4) is disclosed. The sensor (1) is cost effective to manufacture, due to the thin film circuit (4), and corrosion effects are avoided, without having to apply a coating or passivation layer onto the thin film circuit (4), due to the quasi-DC voltage being supplied to the thin film circuit (4).

20 Claims, 4 Drawing Sheets

(56) References Cited

U.S. PATENT DOCUMENTS

| | | |
|---|---|---|
| 6,933,582 B2 | 8/2005 | Ishio et al. |
| 7,085,657 B2 | 8/2006 | Drossel |
| 7,197,939 B2 | 4/2007 | Sakai et al. |
| 7,208,691 B2 | 4/2007 | Bourdelais et al. |
| 7,219,554 B2 | 5/2007 | Fujimoto et al. |
| 7,287,433 B2 | 10/2007 | Tanaka et al. |
| 8,080,997 B2 | 12/2011 | Kassai |
| 2003/0107509 A1* | 6/2003 | Drossel .................. G01L 19/12 341/155 |
| 2006/0278012 A1 | 12/2006 | Fujimoto et al. |
| 2014/0375135 A1* | 12/2014 | Nervegna ............... G01N 27/26 307/86 |

FOREIGN PATENT DOCUMENTS

| | | |
|---|---|---|
| CN | 102649535 A | 8/2012 |
| DE | 31 18 306 A1 | 12/1982 |
| DE | 10 2007 011 878 A1 | 9/2008 |
| EP | 1087219 A2 | 3/2001 |
| EP | 1 785 709 A2 | 5/2007 |
| JP | H10-78363 A | 3/1998 |
| WO | 03/087149 A2 | 10/2003 |
| WO | 2006102460 A1 | 9/2006 |
| WO | 2008110244 A2 | 9/2008 |

OTHER PUBLICATIONS

Danish Search Report for Danish Patent Application No. PA 2013 00354 dated Jan. 24, 2014.
Danish Search Report Serial No. PA201200800.
ISR PCT/DK2013/050400.
Jian, Chen, "Power Electronics Technology in Flexible Power Systems: Applications of Power Electronics Technology in Power Systems," pp. 1-10 (Jan. 2012).

* cited by examiner

THIN FILM SENSOR

CROSS-REFERENCE TO RELATED APPLICATIONS

This application is entitled to the benefit of and incorporates by reference subject matter disclosed in the International Patent Application No. PCT/IB2014/061281 filed on May 8, 2014 and Danish Patent Application No. 201300354 filed on Jun. 11, 2013.

TECHNICAL FIELD

The present invention relates to a sensor, such as a pressure sensor, comprising measuring electronics including a thin film circuit deposited on an isolation layer.

BACKGROUND

Sensors in the form of semiconductor sensor chips are known. For instance, U.S. Pat. No. 5,681,997 discloses a polycrystalline pressure sensor formed by depositing polycrystalline silicon piezoresistors on a polycrystalline sensing diaphragm. The piezoresistors are arranged in a Wheatstone bridge configuration. During operation, an alternating differential signal is applied across the input of the Wheatstone bridge. A measured voltage difference between the output terminals of the Wheatstone bridge is used to detect imbalance in the electrical piezoresistors that corresponds to pressure applied to the sensor.

Sensors comprising a thin film circuit are also known. Such sensors are often cost effective to manufacture. For instance, U.S. Pat. No. 4,777,826 discloses a strain gauge sensor for providing an electrical output responsive to a parameter applied to a substrate. A homogeneous thin film circuit is deposited on an insulating layer which is deposited on a substrate of single-crystal material. A passivation layer is provided on top of the thin film circuit.

One problem with prior art thin film sensors is that corrosion occurs, in particular due to high electrical fields across the thin film circuit. Therefore the material used for the thin film circuit must be selected to be relatively resistant towards corrosion. Furthermore, the thin film circuit must be coated, e.g. with a passivation layer, in order to reduce corrosion. Applying such a coating or passivation layer may introduce strain in the sensor. Such strain may result in strain relieve over time, which in turn may cause the sensor to drift.

SUMMARY

It is an object of embodiments of the invention to provide a sensor which is cost effective to manufacture, while being protected against corrosion.

It is a further object of embodiments of the invention to provide a sensor which is cost effective to manufacture, while being capable of providing reliable measurements.

The invention provides a sensor comprising:
a membrane,
an isolation layer arranged on the membrane,
measuring electronics comprising a thin film circuit deposited on the isolation layer, and
a power supply arranged to supply a quasi-DC voltage to the thin film circuit.

In the present context the term 'membrane' should be interpreted to mean a structure which is flexible, and thereby is capable of deflecting in response to a force being applied to the membrane, e.g. due to a difference in pressure between a first side of the membrane and a second, opposite, side of the membrane.

An isolation layer is arranged on the membrane. In the present context the term 'isolation layer' should be interpreted to mean a layer of a material which provides electrical isolation between the membrane and objects arranged on an opposite side of the isolation layer The sensor further comprises measuring electronics comprising a thin film circuit deposited on the isolation layer. Thus, the thin film circuit is electrically isolated from the membrane by means of the isolation layer. However, the thin film circuit is capable of following deflections of the membrane, and thereby the thin film circuit provides the actual measuring performed by the sensor.

Finally, the sensor comprises a power supply arranged to supply a quasi-DC voltage to the thin film circuit. In the present context the term 'quasi-DC voltage' should be interpreted to mean a DC voltage signal which is alternatingly switched between an upper voltage level and a lower voltage level, in such a manner that the upper voltage level is supplied to one supply node of the thin film circuit when the lower voltage level is supplied to another supply node of the thin film circuit, and vice versa. At specified time intervals, the voltage levels are reversed, so that the voltage level supplied to one node is switched from the upper level to the lower level, while the voltage level supplied to the another node is switched from the lower level to the upper level, etc.

It is an advantage that the measuring electronics comprises a thin film circuit, which provides the actual measuring performed by the sensor, because this is a cost effective way of manufacturing a sensor.

The physical dimensions of a thin film circuit are normally very small. Therefore the dielectric strength between the individual components of the thin film circuit is relatively high, e.g. in the order of kV/m. This high dielectric strength, in combination with moisture, presents a very aggressive environment. This aggressive environment increases the risk of galvanic corrosion of the thin film circuit.

It is further an advantage that the power supply is arranged to supply a quasi-DC voltage to the thin film circuit, because reversing the voltage levels as described above prevents galvanic corrosion of the thin film circuit, due to the alternating anode-cathode polarisation. Thereby corrosion is reduced, and the lifetime of the sensor prolonged, without having to apply a coating or passivation layer on top of the thin film circuit. Accordingly, drift of the sensor due to strain introduced when applying a coating or passivation layer is avoided.

Thus, according to the invention a sensor is provided which is cost effective to manufacture, has a long lifetime, and provides reliable measurements.

The thin film circuit may be or comprises a Wheatstone bridge. According to this embodiment, the quasi-DC voltage may advantageously be supplied in the manner described above to the two input terminals of the Wheatstone bridge.

The isolation layer may be made from $SiO_2$. As an alternative, another electrically isolating material may be used, e.g. another silicon based material, such as $Si_3N_4$.

The membrane may be mounted on or form part of a support structure. The support structure may, e.g., be a rigid frame part, e.g. made from a metal, such as stainless steel.

The sensor may further comprise an electrically conductive guarding layer being arranged between the thin film circuit and the support structure. Since the guarding layer is electrically conductive, it is possible to ensure that the guarding layer is at a desired electrical potential by means of suitable electrical connections. Thereby it is possible to minimise the difference in electrical potential between the thin film circuit and the guarding layer. It is not possible to control the electrical potential of the support structure, and therefore a difference in electrical potential may exist between the electrical components of the thin film circuit and the support structure. If the guarding layer was not present, such a difference in electrical potential could create a capacitive coupling between the electrical components of the thin film circuit and the support structure, and this capacitive coupling would give rise to electromagnetic interference (EMI) in the sensor, in the form of 'chassis noise'. However, when a guarding layer is arranged between the thin film circuit and the support structure, a difference in electrical potential exists between the guarding layer and the support structure, but not between the electrical components of the thin film circuit and the guarding layer. Accordingly, the guarding layer guards the electrical components of the thin film circuit against electromagnetic interference (EMI) in the form of 'chassis noise'.

The guarding layer may be electrically isolated from the membrane and/or from the thin film structure.

The thin film circuit may be metal based, i.e. it may be made from a metal or an alloy. According to this embodiment, the thin film circuit is made from an electrically conductive material. For instance, the thin film circuit may be made from NiCr. Ni is often used for bonding pads. Thus, a thin film circuit made from NiCr can easily be obtained, simply by adding Cr in the sputtering process. As an alternative, the thin film circuit may be made from another suitable metal or alloy, such as TaN.

The sensor may be a strain gauge. In this case, the sensor measures deflections of the membrane caused by forces acting on the membrane. The forces may, e.g., be due to a pressure difference across the membrane, or due to strain or stress in a structure having the membrane attached thereto. In the case that the thin film circuit is or comprises a Wheatstone bridge, the strain may be measured by measuring voltage variations at the output terminals of the Wheatstone bridge.

Alternatively or additionally, the sensor may be a pressure sensor. According to this embodiment, the sensor may advantageously measure pressure differences across the membrane. This may, e.g., be done by measuring deflections of the membrane, due to the pressure differences, and the sensor may, in this case, be a strain gauge as described above. As an alternative, the sensor may be a temperature sensor, a stress gauge, or any other suitable kind of sensor.

The measuring electronics may further comprise a switching arrangement, said switching arrangement being arranged to generate a quasi-DC voltage signal and to supply the generated quasi-DC voltage signal to the thin film circuit. According to this embodiment, the power supply is a DC power supply, and the switching arrangement ensures that the voltage supplied to the thin film circuit is a quasi-DC voltage.

BRIEF DESCRIPTION OF THE DRAWINGS

The invention will now be described in further detail with reference to the accompanying drawings in which.

DETAILED DESCRIPTION

Figure 1:
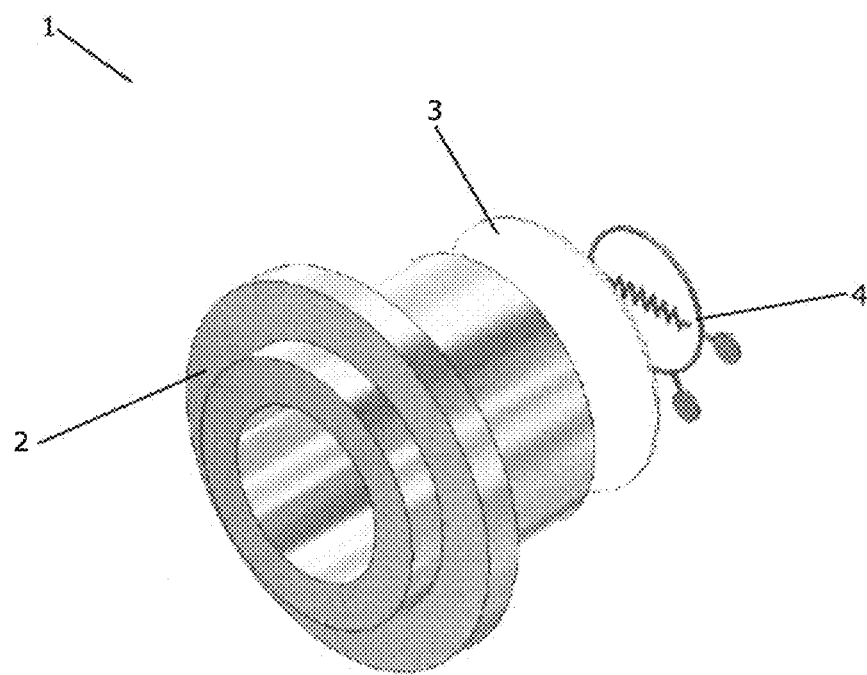
FIG. 1 is an exploded view of a sensor according to an embodiment of the invention.

FIG. 1 is an exploded view of a sensor 1 according to an embodiment of the invention. The sensor 1 comprises a support structure 2 defining a membrane (not visible). An isolation layer 3 is mounted on the membrane, and a thin film circuit in the form of a Wheatstone bridge 4 is deposited onto the isolation layer 3. Thus, the isolation layer 3 electrically isolates the Wheatstone bridge 4 from the membrane, and thereby the support structure 2.

As described above, it is an advantage that the Wheatstone bridge 4 is a thin film circuit, since it is very cost effective to provide the Wheatstone bridge 4, and thereby manufacture the sensor 1.

Figure 2:
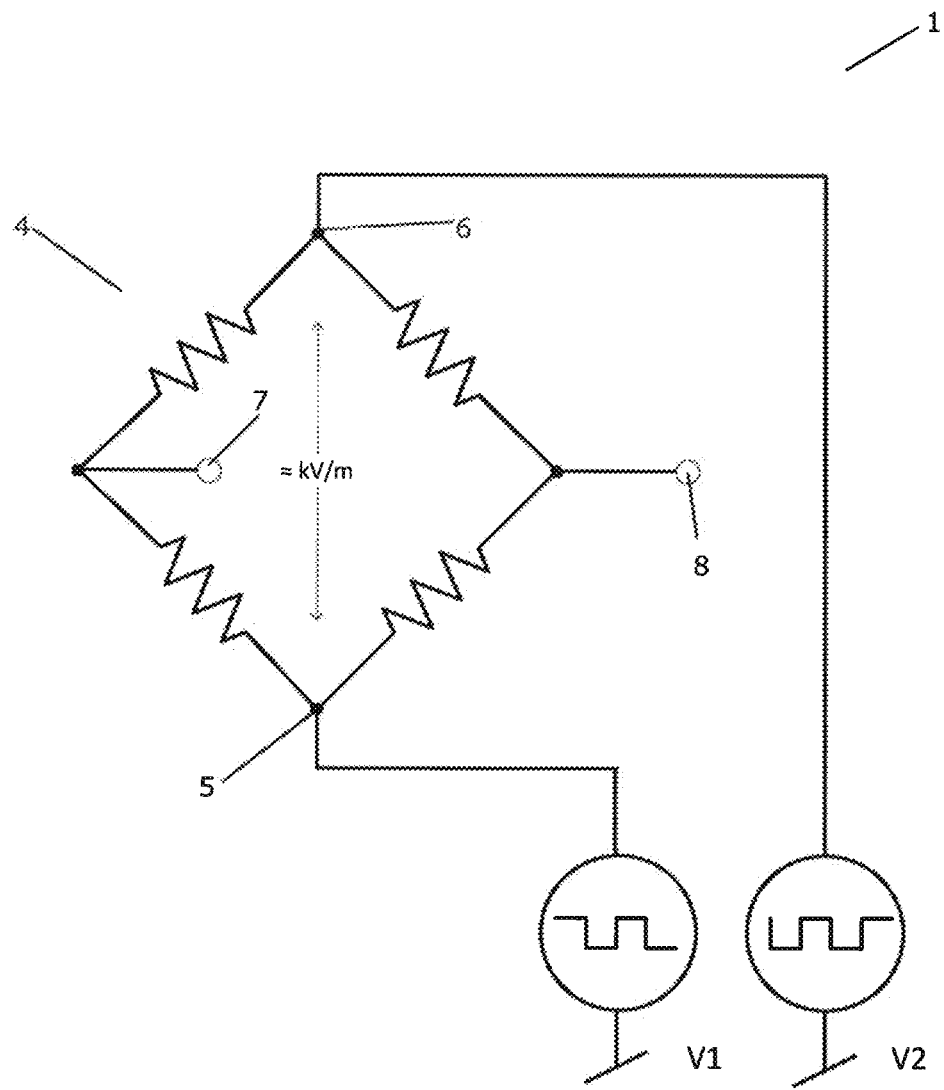
FIG. 2 is a diagrammatic view of a sensor according to a first embodiment of the invention.

FIG. 2 is a diagrammatic view of a sensor 1 according to a first embodiment of the invention. The sensor 1 comprises a thin film circuit in the form of a Wheatstone bridge 4 which is deposited onto an isolation layer (not shown).

A power supply is arranged to supply a first voltage level, $V_1$, in the form of a quasi-DC voltage to a first node 5 of the Wheatstone bridge 4, and a second voltage, $V_2$, in the form of a quasi-DC voltage to a second node 6 of the Wheatstone bridge 4. Accordingly, the voltages, $V_1$ and $V_2$, both alternate between an upper level and a lower level in such a manner that the voltage is initially maintained substantially constant at the upper level, then switched abruptly to the lower level and maintained substantially constant at the lower level before being switched abruptly back to the upper level, etc. Thus, each of the quasi-DC voltages, $V_1$ and $V_2$, defines a period, e.g. being the time elapsing from the voltage is switched to the upper level until the voltage is once again switched to the upper level. Furthermore, when the upper voltage level is supplied to the first node 5, the lower voltage level is supplied to the second node 6, and vice versa.

It is an advantage that the voltages, $V_1$ and $V_2$, supplied to the nodes 5, 6 are in the form of quasi-DC voltages, because alternating the voltages as described above reduces galvanic corrosion effects on the Wheatstone bridge 4. This makes it possible to provide the Wheatstone bridge 4 in the form of a thin film circuit without risking that the lifetime of the sensor 1 is unacceptably short, and without having to apply a coating or passivation layer onto the Wheatstone bridge 4.

The sensor 1 of FIG. 2 may be operated in the following manner. Measuring electronics are connected to nodes 7 and 8 of the Wheatstone bridge 4. Quasi-DC voltages, $V_1$ and $V_2$, are supplied to the nodes 5 and 6 as described above. Changes in a quantity to be measured, such as pressure, strain, stress, temperature, etc., cause the resistance of the resistors of the Wheatstone bridge 4 to change. This will, in turn, cause the voltage difference between the nodes 7 and 8 to change. This change in voltage difference is detected by the measuring electronics, and is used for deriving the changes in the quantity being measured. With an appropriate calibration of the sensor 1, an absolute value of the quantity being measured can be derived.

Figure 3:
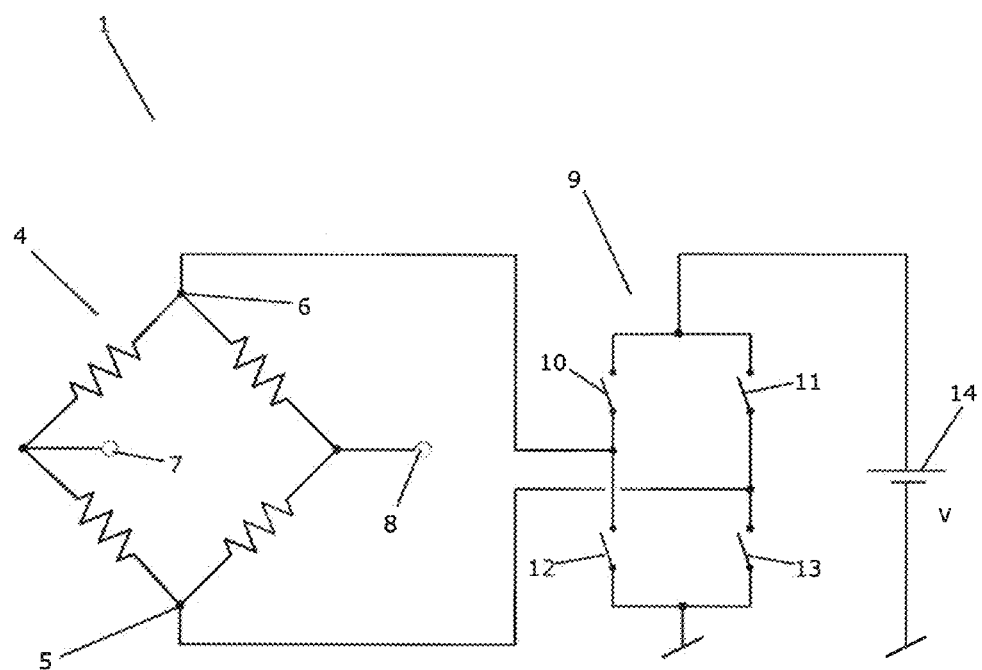
FIG. 3 is a diagrammatic view of a sensor according to a second embodiment of the invention.

FIG. 3 is a diagrammatic view of a sensor 1 according to a second embodiment of the invention. The sensor 1 of FIG. 3 is very similar to the sensor 1 of FIG. 2, and it will therefore not be described in detail here.

The sensor 1 of FIG. 3 comprises a switching arrangement 9 comprising four switches 10, 11, 12, 13 which can be alternatingly opened and closed. In FIG. 3 the switches 10, 11, 12, 13 are shown in the open position. The switching arrangement 9 is electrically connected between a DC power supply 14 and the Wheatstone bridge 4. When switch 10 and switch 13 are closed, and switch 11 and switch 12 are open, an upper voltage level is supplied to the second node 6 of the Wheatstone bridge 4, and a lower voltage level is supplied to the first node 5 of the Wheatstone bridge 4. Similarly, when switch 10 and switch 13 are open, and switch 11 and switch 12 are closed, a lower voltage level is supplied to the second node 6 of the Wheatstone bridge 4, and an upper voltage level is supplied to the first node 5 of the Wheatstone bridge 4. Thus, by switching the switches 10, 11, 12, 13 of the switching arrangement 9 in an appropriate manner, the quasi-DC voltages illustrated in FIG. 2 can be supplied to the Wheatstone bridge 4.

Figure 4:
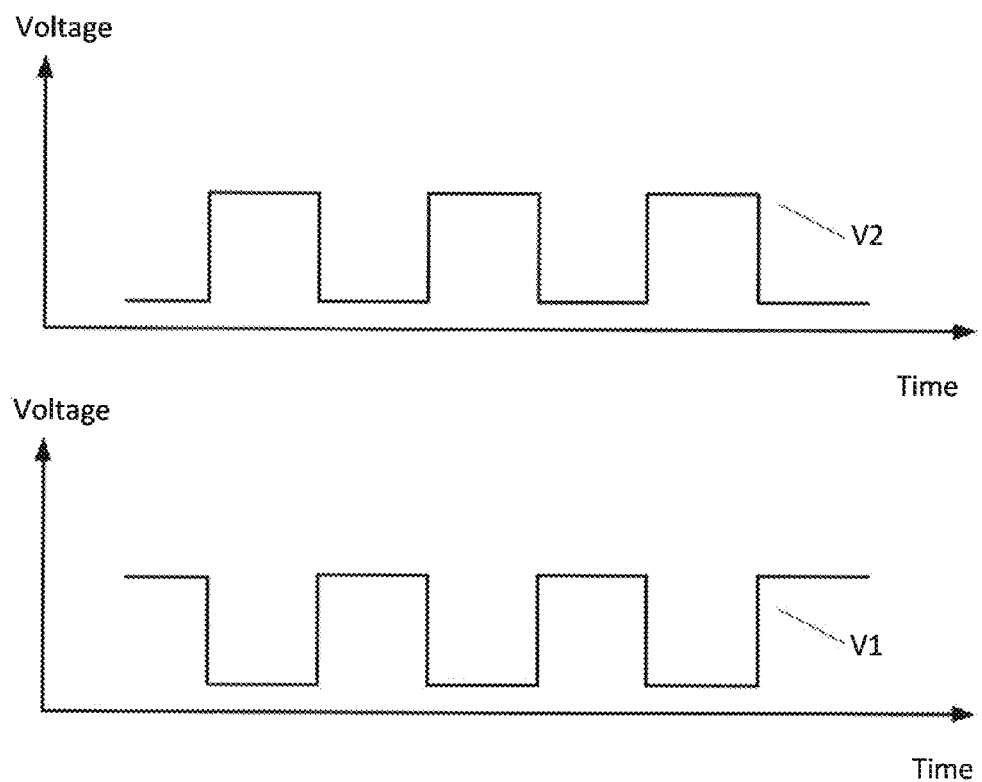
FIG. 4 illustrates voltages supplied to the sensor of FIG. 2.

FIG. 4 illustrates the quasi-DC voltages, $V_1$ and $V_2$, supplied to the nodes 5, 6 of the Wheatstone bridge 4 of the sensor 1 of FIG. 2 or 3, as a function of time. It is clear from FIG. 4 that when the quasi-DC voltage, $V_1$, supplied to the first node 5 of the Wheatstone bridge 4 is at the upper level, the quasi-DC voltage, $V_2$, supplied to the second node 6 of the Wheatstone bridge 4 is at the lower level, and vice versa.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A sensor comprising:
   a membrane,
   an isolation layer arranged on the membrane,
   measuring electronics comprising a thin film circuit deposited on the isolation layer, and
   a power supply arranged to supply a quasi-DC voltage to the thin film circuit,
   wherein the quasi-DC voltage includes a quasi-DC voltage signal which is alternatingly switched between an upper voltage level and a lower voltage level, in such a manner that the upper voltage level is supplied to a first supply node of the thin film circuit when the lower voltage level is supplied to a second supply node of the thin film circuit and, at specified time intervals, the upper voltage level is reversed with the lower voltage level such that the lower voltage level is supplied to the first supply node and the upper voltage level is supplied to the second supply node,
   wherein the measuring electronics further comprises a switching arrangement including four switches that are alternatingly opened and closed to supply the quasi-DC voltage signal to the thin film circuit.

2. The sensor according to claim 1, wherein the thin film circuit is or comprises a Wheatstone bridge.

3. The sensor according to claim 2, wherein the isolation layer is made from $SiO_2$.

4. The sensor according to claim 2, wherein the membrane is mounted on or forms part of a support structure.

5. The sensor according to claim 2, wherein the thin film circuit is metal based.

6. The sensor according to claim 2, wherein the thin film circuit is made from NiCr.

7. The sensor according to claim 1, wherein the isolation layer is made from $SiO_2$.

8. The sensor according to claim 7, wherein the membrane is mounted on or forms part of a support structure.

9. The sensor according to claim 7, wherein the thin film circuit is metal based.

10. The sensor according to claim 7, wherein the thin film circuit is made from NiCr.

11. The sensor according to claim 1, wherein the membrane is mounted on or forms part of a support structure.

12. The sensor according to claim 11, further comprising an electrically conductive guarding layer being arranged between the thin film circuit and the support structure.

13. The sensor according to claim 12, wherein the thin film circuit is metal based.

14. The sensor according to claim 11, wherein the thin film circuit is metal based.

15. The sensor according to claim 11, wherein the thin film circuit is made from NiCr.

16. The sensor according to claim 1, wherein the thin film circuit is metal based.

17. The sensor according to claim 1, wherein the thin film circuit is made from NiCr.

18. The sensor according to claim 1, wherein the sensor is a strain gauge.

19. The sensor according to claim 1, wherein the sensor is a pressure sensor.

20. The sensor according to claim 1, wherein the four switches are alternatingly opened and closed by opening a first pair of the switches and closing a second pair of the switches, and then closing the first pair of switches and opening the second pair of switches.

* * * * *

UNITED STATES PATENT AND TRADEMARK OFFICE
CERTIFICATE OF CORRECTION

PATENT NO. : 9,909,944 B2
APPLICATION NO. : 14/895228
DATED : March 6, 2018
INVENTOR(S) : Steen Moellebjerg Matzen It is certified that error appears in the above-identified patent and that said Letters Patent is hereby corrected as shown below:

On Page 2, Column 2, Line 5, In the Foreign Patent Documents, with regard to reference "WO 03/087149 A2", should correctly appear as "WO 03/087749 A2".

Signed and Sealed this
Seventh Day of August, 2018

Andrei Iancu
*Director of the United States Patent and Trademark Office*